Feb. 21, 1961

R. B. BENSON 2,972,253

ELECTRICAL APPARATUS LIFE INDICATOR

Filed March 24, 1958

Inventor
Robert B. Benson
By Houston L. Swenson
Attorney

United States Patent Office 2,972,253
Patented Feb. 21, 1961

2,972,253

ELECTRICAL APPARATUS LIFE INDICATOR

Robert B. Benson, West Allis, Wis., assignor to Allis-Chalmers Manufacturing Company, Milwaukee, Wis.

Filed Mar. 24, 1958, Ser. No. 723,216

5 Claims. (Cl. 73—350)

This invention relates to an electrical apparatus subject to thermal aging and particularly to a means for indicating the degree of aging of the apparatus.

The aging or loss of life of an electrical apparatus such as a transformer is largely dependent on the degree and duration of heat to which the organic fibrous insulation of the apparatus is subjected. As the temperature of the insulation increases its rate of deterioration increases and, consequently, the ability of the transformer to withstand surges decreases. In due time the solid insulation on the windings of the transformer will deteriorate to the extent that a short circuit may result which puts the transformer out of service.

Numerous devices have been made which flash a signal upon the overload of a transformer. Upon such a signal the overloaded transformer may be replaced with a new transformer. Various methods have been used to predict the life expectancy of a transformer. One such method has been to record the date of installation of the transformer and to remove it from service after a predetermined number of years. This method is rather inaccurate as it does not take into account the extent of overload to which the transformer has been subjected. Manual inspections have also been made. Such inspections are expensive as they require a number of man hours and also are subject to human error.

In recent years several age indicating devices for electrical apparatus have been constructed which attempt to integrate the number of overloads to which the electrical apparatus has been subjected and the degree and duration of each overload. These age indicating devices have attempted to follow a nonlinear aging curve and, consequently, have utilized numerous complicated and expensive mechanical and electrical combinations.

Therefore, in accordance with the present invention, a device is provided which follows the nonlinear aging curve of an electrical apparatus through the novel combination of a relatively few and inexpensive elements. This device comprises a predetermined configurated container which contains an electrical conducting liquid responsive to the temperature of the electrical apparatus and which controls the amount of resistance in series with a motor circuit to vary the speed of a variable speed motor which drives a registering means. It is, therefore, one object of the present invention to provide a device for indicating the physical age or life expectancy of an electrical apparatus.

Another object of the invention is to provide an indicating device responsive to the number of overloads to which an electrical apparatus is subjected and the degree and duration of such overloads.

A further object of the invention is to provide an indicating device responsive to the amount of heat to which the electrical apparatus has been subjected.

A still further object of the invention is to provide an indicating device for integrating and recording the amount of service to which an electrical apparatus has been subjected.

Objects and advantages other than those set forth above will be apparent from the following description when read in connection with the accompanying drawing, in which.

Figure 1:
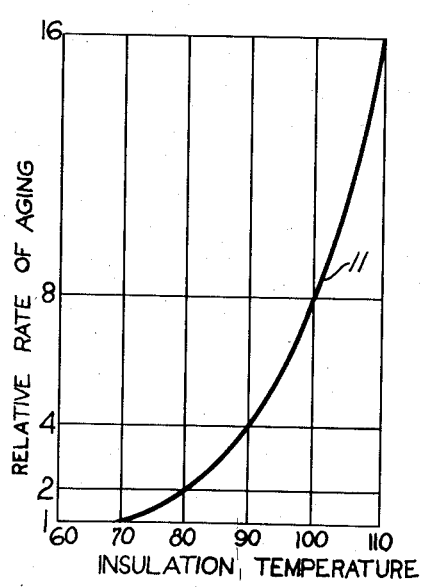
Fig. 1 shows a nonlinear aging curve of an electrical apparatus such as a transformer.

Referring to Fig. 1 curve 11 represents the rate of aging curve of the transformer. As can be seen from curve 11 and its indexes the approximate aging rate for a transformer doubles with every 10° C. rise in temperature. Thus, for example, assuming that a transformer has a life expectancy of thirty years at a temperature of 70° C. the life expectancy of the transformer will be reduced to fifteen years if the temperature of the transformer increases to a constant of 80° C. because its aging rate has doubled.

Figure 2:
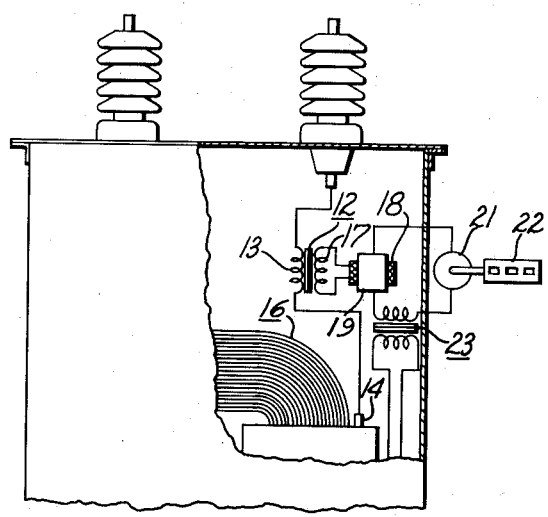
Fig. 2 is a diagrammatic view of the invention as applied to a transformer.

It is to this characteristic that the apparatus shown in Fig. 2 is correlated. Insulation in a transformer usually breaks down first at the hot spot of the transformer, the spot within the transformer having the most intense heat. In order to have a correct and accurate age indicating device, the device is correlated to the transformer overload currents since the hot spot temperature is directly related to the overloads. As illustrated in Fig. 2 this is accomplished in a conventional manner by utilizing a current transformer 12 having a primary winding 13 which is connected in series with coil 14 of main transformer 16. Secondary winding 17 of the current transformer 12 is in series with a heater coil 18 which in turn causes a thermally responsive device 19 to become proportionately heated to the hot spot temperature of the main transformer. Another suitable method for heating the thermally responsive device 19 is to imbed the device in the coil 14 of the transformer 16 whereby the device is subjected to a temperature proportionate to the hot spot temperature of the transformer. Thermally responsive device 19 is in series with a variable speed motor 21 such as a small eddy current motor, the speed of which is directly proportional to the current operating it. The operating current for the motor is supplied by a constant voltage transformer 23 which is connected to one set of the terminals of the main transformer 16. A registering means 22 is driven by motor 21 and comprises a counter which indicates the remaining life, or, if so desired, the expended life of the transformer. For example, a transformer may have a normal life expectancy of thirty years when not subjected to any overloads or extreme temperatures. However, after the transformer has been in service fifteen years it is possible that its registering means 22 will show only twenty percent remaining life. This is because the transformer has been subjected to abnormally high temperatures caused by overloads or excessive ambient temperatures.

Figure 3:
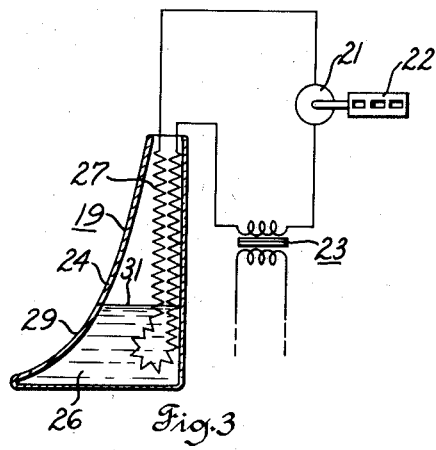
Fig. 3 is one illustration of the invention with a linear resistance immersed in a configurated mercury vat which varies the amount of resistance in series with an eddy current motor.

One embodiment of thermally responsive device 19 is shown in Fig. 3. A container 24 made of a dielectric material holds an electrical conducting heat expansible liquid 26, such as mercury which preferably has a substantially uniform rate of expansion. An elongated resistance element 27 preferably having a linear characteristic is in series with motor 21 and disposed within container 24. A portion of resistance element 27 which is formed into a spaced loop is uninsulated and is partially submerged in the mercury. Inasmuch as element 27 is in series with motor 21 which is continuously operating it is apparent that by altering the amount of resistance in series with motor 21 the amount of current supplied to motor 21 by power transformer 23 will also be altered. In turn, the speed of motor 21 will be directly affected by the amount of current supplied to it and, likewise, the reading from meter 22 is directly dependent upon the speed of motor 21.

In carrying out this invention container 24 is of a predetermined configuration. The container is preferably rectangular in a cross section taken normal to its longitudinal axis and has a surface 29 which has a slope identical to the slope of curve 11 shown in Fig. 1. As illustrated in Fig. 2, the thermally responsive device 19 is encircled by heater coil 18 which causes the mercury 26 to be heated proportionately to the hot spot temperature of the transformer. As a greater load is placed on the transformer the mercury in container 24 becomes hotter and tends to expand and rise in container 24. As the level 31 of the electrically conductive mercury rises it cuts out some of the uninsulated linear resistance which is in series with the motor. The switching out of this resistance, of which the quantity in series with the motor is proportional to the rate of aging of the transformer, tends to increase the speed of the motor. The ascent of the level 31 of mercury 26 in container 24 is similar to curve 11 because of the specially configurated surface 29. This characteristic is a combination of the fact that mercury is substantially uniformly expansible in proportion to its temperature and the fact that the container 24 is specially configurated to provide a decreasing cross section. In short, the rate of ascent of the level 31 of the mercury is identical to the rate of aging curve of a transformer.

Motor 21 which is continuously running is calibrated with resistance 27 in such a manner as to show zero life expectancy on the registering means 22 after a predetermined amount of time if the associated transformer is operated at a constant predetermined temperature during that period. For example, a base period of about thirty years might be appropriate for a transformer which has operated continuously at a temperature of 70° C. Thus, if the temperature of the transformer does not exceed 70° C. the motor will cause the registering means to show no life expectancy after an actual period of thirty years at continuous operation. The base period for a transformer may be determined by accelerated aging tests and by transformers which have been proven capable of operating a certain number of years within a limited temperature range.

Figure 4:
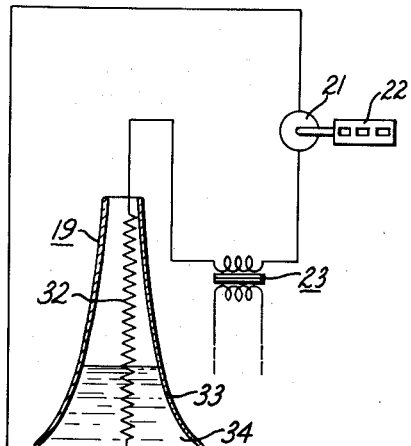
Fig. 4 shows another embodiment of the invention.

The embodiment of my invention in Fig. 4 differs in that a resistance element 32 runs from one end to the other end of a uniformly configurated container 33. Whatever portion of the resistance element is submerged in the electrically conductive liquid 34 is bypassed and the motor circuit is completed between the surface of the liquid and point 35 where the lead to element 32 enters at the base of the container. In this embodiment container 33 has two predetermined surfaces which combine to simulate rate of aging curve 11. Consequently, the rate of ascent of the level of the mercury is again similar to the rate of aging curve 11.

Although several embodiments of the present invention have been illustrated and described it will be apparent to those skilled in the art that various changes and modifications may be made therein without departing from the spirit of the invention or from the scope of the appended claims.

What is claimed is:

1. A life indicator for an electrical apparatus subject to aging at a rate which increases upon an increase in its insulation temperature, said indicator comprising: a unidirectional rotatable counter; a variable speed motor driving said counter; an electrical power supply connected to said motor; a predetermined configurated container having a varying cross sectional area correlated to the aging rate of said apparatus and made of a dielectric material; an electrically conductive and heat expansible liquid partially filling said container; an uninsulated elongated resistance element partially submerged in said liquid and in series relationship with said motor and said power supply; and heating means surrounding said container and correlated to the insulation temperature of said apparatus for causing said liquid to be expansibly responsive to the insulation temperature of said apparatus whereby the quantity of said resistance element in series relationship with said motor is proportional to the rate of aging of said apparatus.

2. A life indicator for an electrical apparatus subject to aging at a rate which increases upon an increase in its insulation temperature, said indicator comprising: a unidirectional rotatable counter; a variable speed motor driving said counter; an electrical power supply connected to said motor; a predetermined configurated container made of a dielectric material, said container having a curved surface with a slope identical to the slope of the rate of aging curve of said apparatus, with the remaining surfaces of said container being plane; a liquid contained in said container, said liquid being an electrically conductive and heat expansible type; an elongated resistance element in series with said motor and said power supply, said element having an uninsulated portion partially submerged in said liquid; and heating means for causing said liquid to be expansibly responsive to the insulation temperature of said apparatus whereby the rate of operation of said registering means is proportional to the rate of aging of said apparatus.

3. A life indicator for an electrical apparatus subject to aging at a rate which increases upon an increase in its insulation temperature, said indicator comprising: a unidirectional rotatable counter; a variable speed motor driving said counter; an electrical power supply connected to said motor; a predetermined configurated container made of a dielectric material, said container having a longitudinal curved surface with a slope identical to the slope of the rate of aging curve of said apparatus; an electrically conductive and heat expansible liquid partially filling said container; two spaced lengths of an uninsulated linear resistance element longitudinally positioned in said container, an end of one length in series relationship with said motor, the like end of said other length in series relationship with said power supply, and the opposite end of each said length submerged in said liquid; and heating means surrounding said container and correlated to the insulation temperature of said apparatus for causing said liquid to be expansibly responsive to the insulation temperature of said apparatus whereby the quantity of said resistance element submerged in said liquid and removed from series relationship with said motor is proportional to the rate of aging of said apparatus.

4. A life indicator for an electrical apparatus subject to aging at a rate which increases upon an increase in its insulating temperature, said indicator comprising: a unidirectional rotatable counter; a variable speed motor driving said counter; an electrical power supply connected to said motor; a predetermined configurated container made of a dielectric material, said container having a longitudinal curved surface with a slope identical to the slope of the rate of aging curve of said apparatus; an electrically conductive and heat expansible liquid partially filling said container; an uninsulated elongated resistance element partially submerged in said liquid and in series relationship with said motor and said power supply; and heating means surrounding said container and correlated to the insulation temperature of said apparatus for causing said liquid to be explansibly responsive to the insulation temperature of said apparatus whereby the electrical quantity of said resistance element in series relationship with said motor is proportional to the rate of aging of said apparatus.

5. A life indicator for an electrical apparatus subject to aging at a rate which increases upon an increase in its insulation temperature, said indicator comprising: a unidirectional rotatable counter; a variable speed motor driving said counter; an electrical power supply connected to said motor; a predetermined configurated container, said container having a longitudinal curved surface with a slope identical to the slope of the rate of aging curve of said apparatus; an electrically conductive and heat expansible liquid partially filling said container; an uninsulated linear resistance element longitudinally positioned in said container, one end of said element in series relationship with said motor, the other end of said element submerged in said liquid and in series relationship with said power supply, and means surrounding said container for causing said liquid to be expansibly responsive to the insulation temperature of said apparatus whereby the quantity of said resistance element submerged in said liquid and removed from series relationship with said motor is proportional to the rate of aging of said apparatus.

References Cited in the file of this patent

UNITED STATES PATENTS

| | | |
|---|---|---|
| 526,220 | Coleman | Sept. 18, 1894 |
| 776,491 | Bristol | Dec. 6, 1904 |
| 1,120,214 | Metzdorff | Dec. 8, 1914 |
| 1,601,744 | Spitzglass | Oct. 5, 1926 |
| 2,505,521 | Boyajian | Apr. 25, 1950 |
| 2,730,706 | Manke | Jan. 10, 1956 |